Aug. 19, 1941.  W. L. BENEDICT  2,253,011
TREATMENT OF HYDROCARBON OILS
Filed Dec. 31, 1937
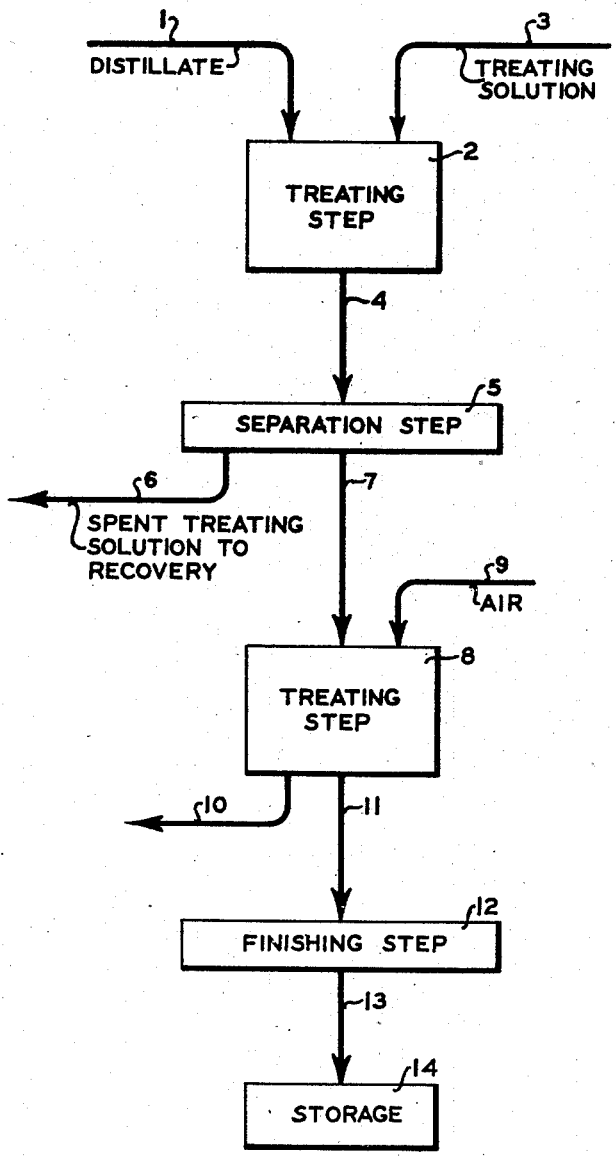
INVENTOR
WAYNE L. BENEDICT
BY
ATTORNEY Patented Aug. 19, 1941

2,253,011

UNITED STATES PATENT OFFICE 2,253,011

TREATMENT OF HYDROCARBON OILS

Wayne L. Benedict, Chicago, Ill., assignor to Universal Oil Products Company, Chicago, Ill., a corporation of Delaware Application December 31, 1937, Serial No. 182,919

7 Claims. (Cl. 196—30)

This invention relates particularly to a process for the treatment of hydrocarbon fractions of approximate motor fuel boiling range which have been produced by polymerizing the olefins contained in gaseous hydrocarbon mixtures and specifically those produced by the use of catalysts to effect the polymerization reactions.

The process is particularly concerned with the sweetening of such polymer fractions particularly in case they have been formed from olefin-containing gas mixtures characterized by a relatively high hydrogen sulfide content so that mercaptans have been formed in usually large quantities due to the condensation reactions occurring between hydrogen sulfide and the olefins. It is, however, distinctly applicable to any low boiling motor fuel distillate which is similar in character in that it contains relatively high percentages of mercaptans and unsaturated hydrocarbons such as, for example, a motor fuel distillate produced by intensive cracking reactions of sulfur-containing charging stocks.

The present process is a contribution to the art of sweetening and otherwise refining sour motor fuels and is adapted to cases wherein older and better known methods of treatment are inadequate to effect the desired refining. These older methods of sweetening comprise generally the use either of sodium plumbite solutions (followed by sulfur to "break out" lead sulfide from the soluble lead mercaptides originally formed) or the use of alkali or alkaline earth metal hypochlorites. The plumbite method is quite generally applicable to moderately sour distillates, both cracked and straight run, while the hypochlorite methods are seldom applicable to cracked distillates though effective on sour straight run distillates and natural gasolines.

The polymer fractions to the sweetening of which the present process is especially adapted consist principally of the dimers and trimers and some mixed polymerization products of the normally gaseous heavy olefins which term is ordinarily applied to propene and the various butenes. However, such liquid polymer mixtures are frequently contaminated with products of the polymerization of compounds of a more unsaturated character than the mono-olefins mentioned consisting of conjugated diolefins which have a tendency to absorb oxygen and deposit gummy materials which are undesirable in motor fuel blending stocks. The presence of mercaptans has already been explained as possibly resulting from the combination of hydrogen sulfide and various olefins both the mono-olefins and those of a more unsaturated character. Such impure polymer blending materials may result from the polymerization of the olefins in cracked gas mixtures by contact with catalysts such as for example the solid phosphoric acid catalysts, in case the original gas mixture has not been specially purified before contact with the catalyst.

In one specific embodiment the present invention comprises the following sequence of steps in treating low boiling hydrocarbon mixtures for the removal of hydrocarbons more unsaturated than mono-olefins and for the removal of mercaptans:

(1) Treatment with a slurry of cuprous chloride in ammonium chloride solution, and (2) with cupric copper-containing reagents either in the form of solid granules or in solution.

In the first step of the process consisting in the treatment with slurries of cuprous chloride in ammonium chloride, the raw distillates may be contacted with the reagent in the ordinary type of treating equipment employed with other liquid chemical reagents such as, for example, a batch agitator in which contact is brought about by circulation by means of outside pumps or interior mechanical stirring devices, or in the ordinary types of continuous treaters which involve the forced passage of the treating reagent and the distillate through mixing devices, after which they pass to a settler from which the treated oil is drawn from the top and the spent or partly spent reagents from the bottom.

The primary treatment of the present process viewed in the light of percentage of the total effect is much more far-reaching than the treatment of the secondary stage although the latter is also essential. As will be shown in later examples, the use of the slurry of cuprous chloride not only removes substantially all of the highly unsaturated hydrocarbons of the nature of diolefins but also by far the greater portions of the mercaptans which render the distillate sour to the doctor test. Evidently both types of compounds form loose addition complexes with the cuprous chloride which appear as a more or less voluminous precipitate which can be either settled or filtered as desired. It is probable that the olefins add directly to the cuprous chloride without alteration of the molecular structure of either while the mercaptans react with the copper salt to form copper mercaptides which are of a nature rendering most of them insoluble in the gasoline or other distillate undergoing sweetening treatment. However, a certain portion of the mercaptans which render the distillate sour are not removable by the cuprous chloride so that it is necessary to employ a second treating step to complete the sweetening reactions.

Following the primary treatment for the removal of diolefins and a major portion of the mercaptans, the distillates are subjected to the sweetening action of cupric salts either in solution or in solid form for the completion of the sweetening reactions. As an example of a reagent which may be used in this connection, a saturated solution of copper sulfate pentahydrate ($CuSO_4.5H_2O$) in ammonium chloride ($NH_4Cl$) solution may be mentioned though other copper salts may be employed and also corresponding halides of alkali metals in place of ammonium chloride. When such solutions are employed, the method of contacting will be the same as in the case of the primary step although the treatment may be simpler owing to the fact that there is usually a smaller amount of suspended material and in some cases no other effect beyond the sweetening of the distillate except the development of some color and haze which may be removed by steps to be described later.

The preferred method of treating to complete the removal of mercaptans and the final sweetening of the distillate from the primary step consists in passing the distillate mixed with air through granular contact material composed of cupric salts and ammonium chloride mixed with or deposited upon relatively inert granular spacing materials to form a stationary contact mass. The following table shows a characteristic composition of such a contact mass although some variations are permissible from the exact percentages shown.

*Composition of sweetening reagent*

| Ingredient | Percent by weight* |
|---|---|
| Ammonium chloride ($NH_4Cl$) | 12.5 |
| Copper sulfate ($CuSO_4.5H_2O$) | 12.5 |
| Fire clay, 6-30 mesh | 75.0 |

*Calculated on a dry basis except for the water of composition of the crystalline copper sulfate.

It has been found essential to the efficient operation with solid reagents of the above general character to maintain the water content of the composite reagent within rather narrow limits. Experiments have shown that there is a definite shortening of the life of the reagent if there is not sufficient water present to provide the necessary five moles of crystallization for the copper sulfate and that on the other hand, there is an upper limit of water content which corresponds to actual wetting of the granular reagent, which is followed by its packing in the treating chambers with increased resistance to flow and a greatly increased tendency to channeling. When passing the mixture of distillate and air through material of this composition, the reactions given below may be assumed to occur more or less simultaneously.

(1) Sweetening reaction—

$$2CuCl_2 + 2RSH \rightleftharpoons 2CuCl + 2HCl + R_2S_2$$

(2) Reactivation reaction—

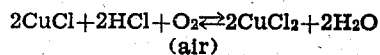
$$2CuCl + 2HCl + O_2 \rightleftharpoons 2CuCl_2 + 2H_2O$$
(air)

While the above equations do not represent the total of the reactions occurring, they may be taken as typical. It will be seen from the first equation that cupric chloride has been assumed to be the active reagent which is reduced to cuprous chloride and then simultaneously regenerated by the combined action of hydrochloric acid and the oxygen of the air. One of the net results of these reactions is the generation of considerable quantities of water depending upon the amount of mercaptans present. While there is probably a very small loss of hydrochloric acid ordinarily, provision is usually made for introducing a make-up intermittently.

In some instances an undesirable effect of sweetening with copper-containing reagents is the development of color and haze in the distillate which may be due to soluble copper compounds of an organic character although the exact composition of such is difficult to determine analytically. When this phenomenon occurs it is best practice to subject the distillate to a final treatment with either solutions of alkali metal sulfides or granular heavy metal sulfides such as those of zinc, iron, etc., which apparently act both to filter out color mechanically and to convert the soluble material into soluble compounds which are then adsorbed and held on the solid material. The use of this step is optional and is not included as a special feature of the present invention.

In using the granular reagents containing copper for the sweetening step the usual procedure is to force the partly treated distillate downwardly through stationary beds of the granular reagent contained in vertical cylindrical treating towers at ordinary or elevated temperatures or preferably in admixture with a certain amount of air to effect the simultaneous regeneration of active copper salts until the reagent becomes spent principally by the accumulation of moisture which is detrimental beyond a certain limit. At this time, the stream of distillate undergoing sweetening may be diverted to other fresh beds of reagent and the spent material regenerated by passing air upwardly therethrough to reduce the moisture content to a permissible point and loosen the granular mass which ordinarily becomes impacted after a considerable period during which the oil is passed downwardly therethrough. After this use of air, the distillate is preferably passed upwardly for a certain period of time to redistribute the active salts which have been observed to be carried along with the distillate stream so that they tend to concentrate in the lower portions of the bed. After tests have indicated that a redistribution of the salts has taken place, the downflow may be resumed. It is a feature of the present invention that when solutions of cupric salts are used for the final stage of sweetening, the resulting solution which then contains cuprous chloride may be used in the primary stage of the process as already described so that maximum efficiency is developed in the use of the copper salts.

It is comprised within the scope of the invention to employ any necessary regeneration or reactivation of the spent reagents to restore them to a composition suitable for further use.

The invention will be further understood by reference to the accompanying drawing, which is in the form of a flow chart and is purely diagrammatical.

Referring to the drawing, the hydrocarbon distillate to be treated is introduced through line 1 to the first treating step 2 wherein it is contacted with the treating solution introduced through line 3. This solution, as previously indicated, comprises a slurry of cuprous chloride in ammonium chloride solution. The contacting may be carried out in any well-known manner whereby intimate mixing of the distillate and the solution is accomplished. The mixture is passed through line 4 to a suitable separation step 5 wherein the spent treating solution is allowed to separate and is withdrawn through line 6 to a suitable recovery system from which the recovered treating reagent may be returned to the first treating step. The distillate is removed from separation step 5 through line 7 to the second treating step 8 wherein it is contacted with a copper-containing sweetening reagent of the character previously described. Where the treating step is of such a character as to permit simultaneous sweetening and reactivation, air or other oxygen containing gas may be introduced through line 9. The distillate may be separated from the excess air which is removed from the system through line 10. The sweetened distillate is removed through line 11 to the finishing step 12. This step consists in a treatment for removal of copper compounds from the treated distillate in order to prevent undesirable effects which may be caused by the presence of copper. This treatment may consist in contacting the distillate with a heavy metal sulfide such as zinc sulfide and the like, thereby removing copper. The finished distillate is then removed through line 13 to storage 14.

The following example is given to indicate the general type of results obtainable in practice by the use of the process of the invention although not with the intention of undesirably circumscribing its proper scope.

A polymer gasoline made by treating an olefin-containing gas mixture by contact with solid phosphoric acid catalyst contained 1.65% total sulfur of which 67% or 1% of the total polymer was in the form of mercaptan sulfur. The polymers were first treated with a slurry consisting of a suspension of 5% by weight of cuprous chloride in a 10% ammonium chloride solution. The reagent was applied portionwise until no further reaction was observed, after which the partly treated distillate was filtered clear by passage through a sand filter.

The polymers were then passed downwardly through a bed of granular material containing copper sulfate pentahydrate ($CuSO_4.5H_2O$), ammonium chloride ($NH_4Cl$), and crushed fireclay in the proportions given in a preceding paragraph and in an alternative test of the same preliminarily treated material a solution of the copper sulfate-ammonium chloride reagent was employed. The following tabulation shows the significant results obtained.

| Primary treat | Secondary treat | Dr. test | Percent sulfur |
|---|---|---|---|
| None | None | Positive | 1.65 |
| $CuCl+NH_4Cl$ Soln | None | Positive | 0.70 |
| $CuCl+NH_4Cl$ " | Granular $CuSO_4.5H_2O$-$NH_4Cl$. | Negative | 0.60 |
| $CuCl+NH_4Cl$ " | $CuSO_4.5H_2O+NH_4Cl$ Solution. | Negative | 0.55 |

Several things will be observed from the above data. In the first place it will be seen that the primary treatment of the invention as shown in the second line of data did not entirely sweeten the distillate charged. However, by the application for the copper sweetening reagents as shown in lines 3 and 4, the doctor test was rendered negative and the sulfur content was reduced to a point evidently corresponding to complete removal of the mercaptan content.

Other tests of the gum content and analyses for gum formers such as diolefins indicated that these were entirely absent.

The nature of the present invention and its practical possibilities are evident from the foregoing descriptive and numerical facts respectively although neither is intended to unduly limit its proper scope.

I claim as my invention:

1. A method for sweetening hydrocarbon distillates which comprises treating the distillate with a slurry produced by suspending cuprous chloride in an aqueous ammonium chloride solution, separating the distillate from resultant solid reaction products, and then further treating the distillate with a cupric salt.

2. A method for sweetening hydrocarbon distillates which comprises treating the distillate with a slurry produced by suspending cuprous chloride in an aqueous ammonium chloride solution, separating the distillate from resultant solid reaction products, and then further treating the distillate with a mixture of a cupric salt and an ammonium halide.

3. A method for sweetening hydrocarbon distillates which comprises treating the distillate with a slurry produced by suspending cuprous chloride in an aqueous ammonium chloride solution, separating the distillate from resultant solid reaction products, and then further treating the distillate with a solution containing a cupric salt and an ammonium halide.

4. A method for sweetening hydrocarbon distillates which comprises treating the distillate with a slurry produced by suspending cuprous chloride in an aqueous ammonium chloride solution, separating the distillate from resultant solid reaction products, and then percolating the distillate through a solid contact material containing a cupric salt and an ammonium halide.

5. A method for sweetening hydrocarbon distillates which comprises treating the distillate with a slurry produced by suspending cuprous chloride in an aqueous ammonium chloride solution, separating the distillate from resultant solid reaction products, and then further treating the distillate with a reagent comprising cupric sulfate and ammonium chloride.

6. A method for sweetening hydrocarbon distillates which comprises treating the distillate with a slurry produced by suspending cuprous chloride in an aqueous ammonium chloride solution, separating the distillate from resultant solid reaction products, and then further treating the distillate with a solution containing cupric sulfate and ammonium chloride.

7. A method for sweetening hydrocarbon distillates which comprises treating the distillate with a slurry produced by suspending cuprous chloride in an aqueous ammonium chloride solution, separating the distillate from resultant solid reaction products, and then percolating the distillate through a solid contact material containing a copper sulfate pentahydrate and ammonium chloride.

WAYNE L. BENEDICT.